April 4, 1961 D. D. HODGES 2,977,752
GROUND SPEED COMPUTER
Filed Oct. 16, 1958 5 Sheets-Sheet 1
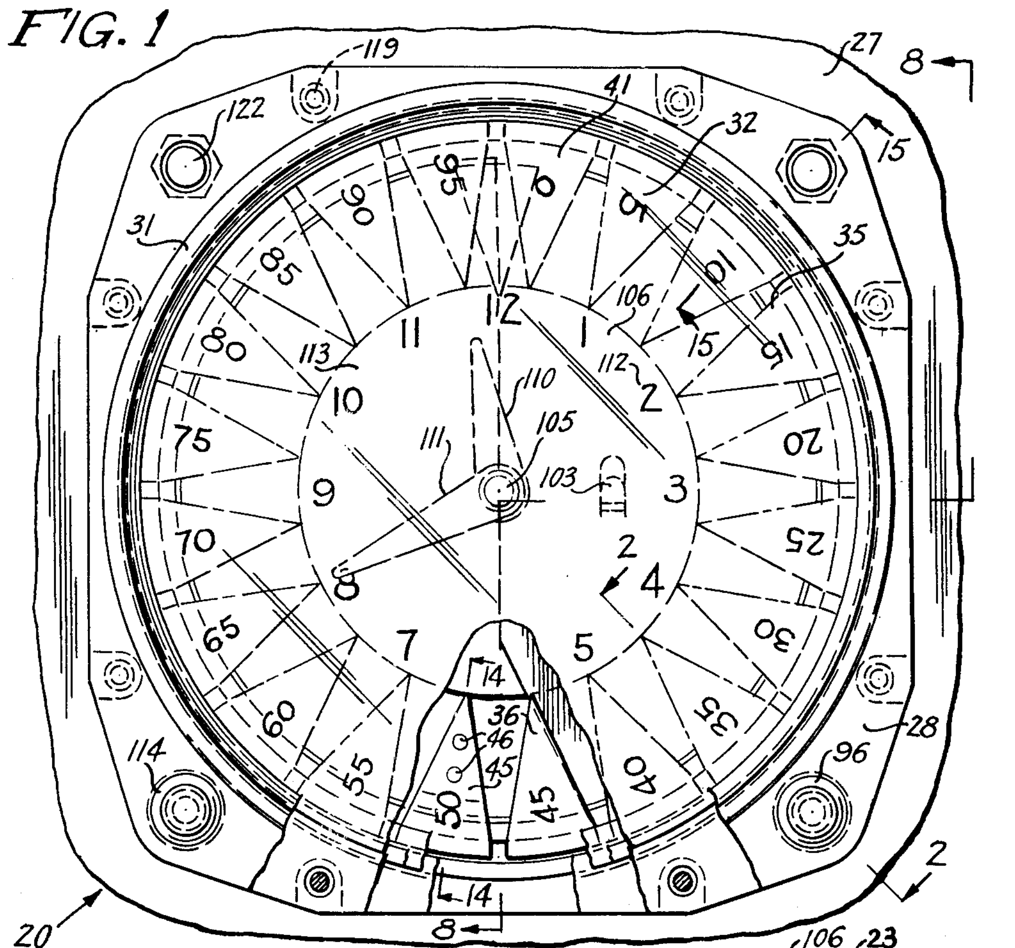
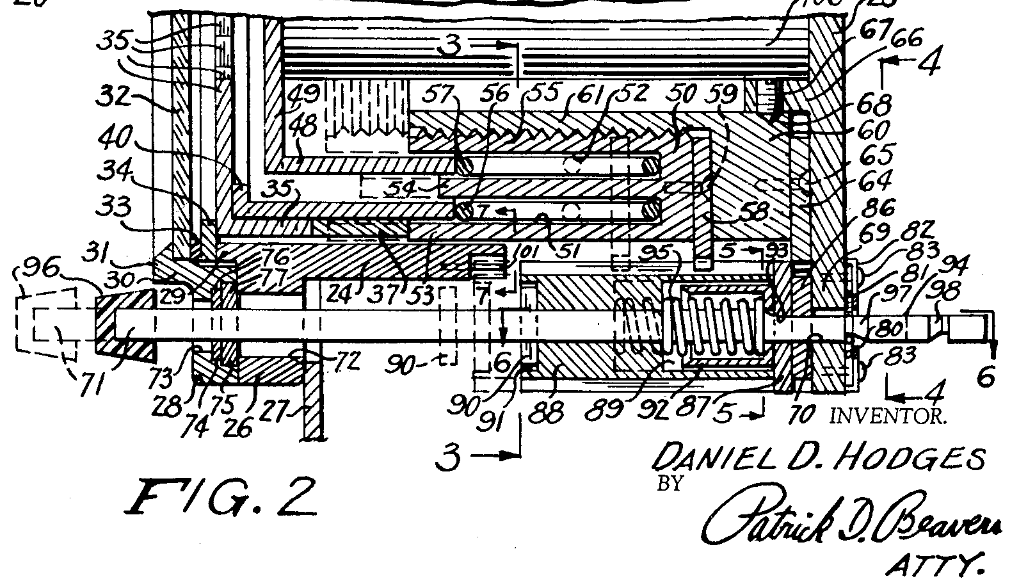
FIG. 2
INVENTOR.
DANIEL D. HODGES
BY
Patrick D. Beavers
ATTY.

April 4, 1961 D. D. HODGES 2,977,752

GROUND SPEED COMPUTER

Filed Oct. 16, 1958 5 Sheets-Sheet 2

INVENTOR.
DANIEL D. HODGES
BY
Patrick D. Beavers
ATTY.

April 4, 1961 D. D. HODGES 2,977,752

GROUND SPEED COMPUTER

Filed Oct. 16, 1958 5 Sheets-Sheet 3

INVENTOR.
DANIEL D. HODGES
BY
Patrick D. Beavers
ATTY.

INVENTOR.
DANIEL D. HODGES
BY
Patrick D. Beavers
ATTY.

INVENTOR.
DANIEL D. HODGES
BY Patrick D. Beavers
ATTY.

2,977,752

GROUND SPEED COMPUTER

Daniel D. Hodges, 2037 Huckleberry Ave., Ridgeview Park, Davenport, Iowa

Filed Oct. 16, 1958, Ser. No. 767,597

9 Claims. (Cl. 58—126)

This invention relates to improvements in ground speed computers that are adapted to be incorporated with a standard two inch aircraft panel clock and is adapted to be placed in a third inch clock opening in an aircraft instrument panel.

An object of this invention is to provide a ground speed computer that will indicate the time elapsed from take-off, the ground speed of the aircraft, the number of ground miles traveled and elapsed time, exact time of arrival at destination and time of day.

The present invention, therefore, provides an instrument that permits a pilot to determine his required ground speed, since the time of take-off is indicated and the exact time of arrival at destination is indicated, he can, by knowing the elapsed time from take-off, vary his ground speed to reach his destination at the specified time.

With the above and other objects and advantages in view, the invention consists of the novel details of construction, arrangement and combination of parts more fully hereinafter described, claimed and illustrated in the accompanying drawings, in which:

Fig. 1 is a face view, partly broken away, of a ground speed computer embodying the invention;

Fig. 2 is a transverse sectional view on the line 2—2 of Fig. 1;

Figure 3:
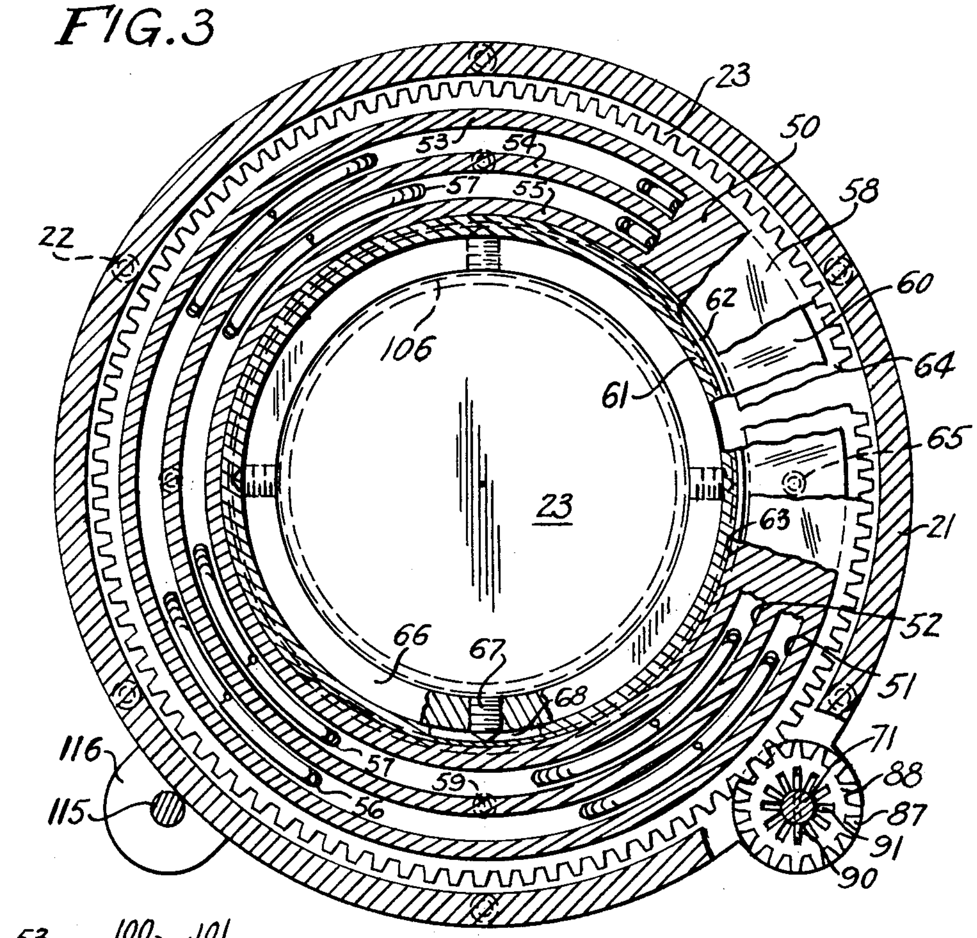
Fig. 3 is a vertical sectional view on the line 3—3 of Fig. 2.
Figures 5, 6, 7:
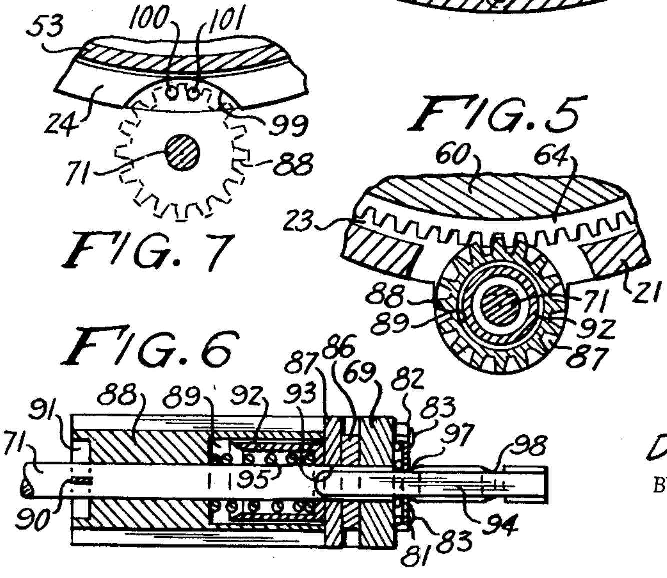
Fig. 5 is a vertical sectional view on the line 5—5 of Fig. 2.
Fig. 6 is a transverse sectional view on the line 6—6 of Fig. 2.
Fig. 7 is a vertical sectional view on the line 7—7 of Fig. 2.
Figure 4:
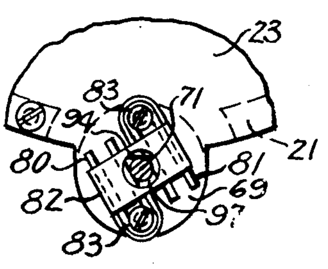
Fig. 4 is a vertical sectional view on the line 4—4 of Fig. 2.
Figures 8, 9:
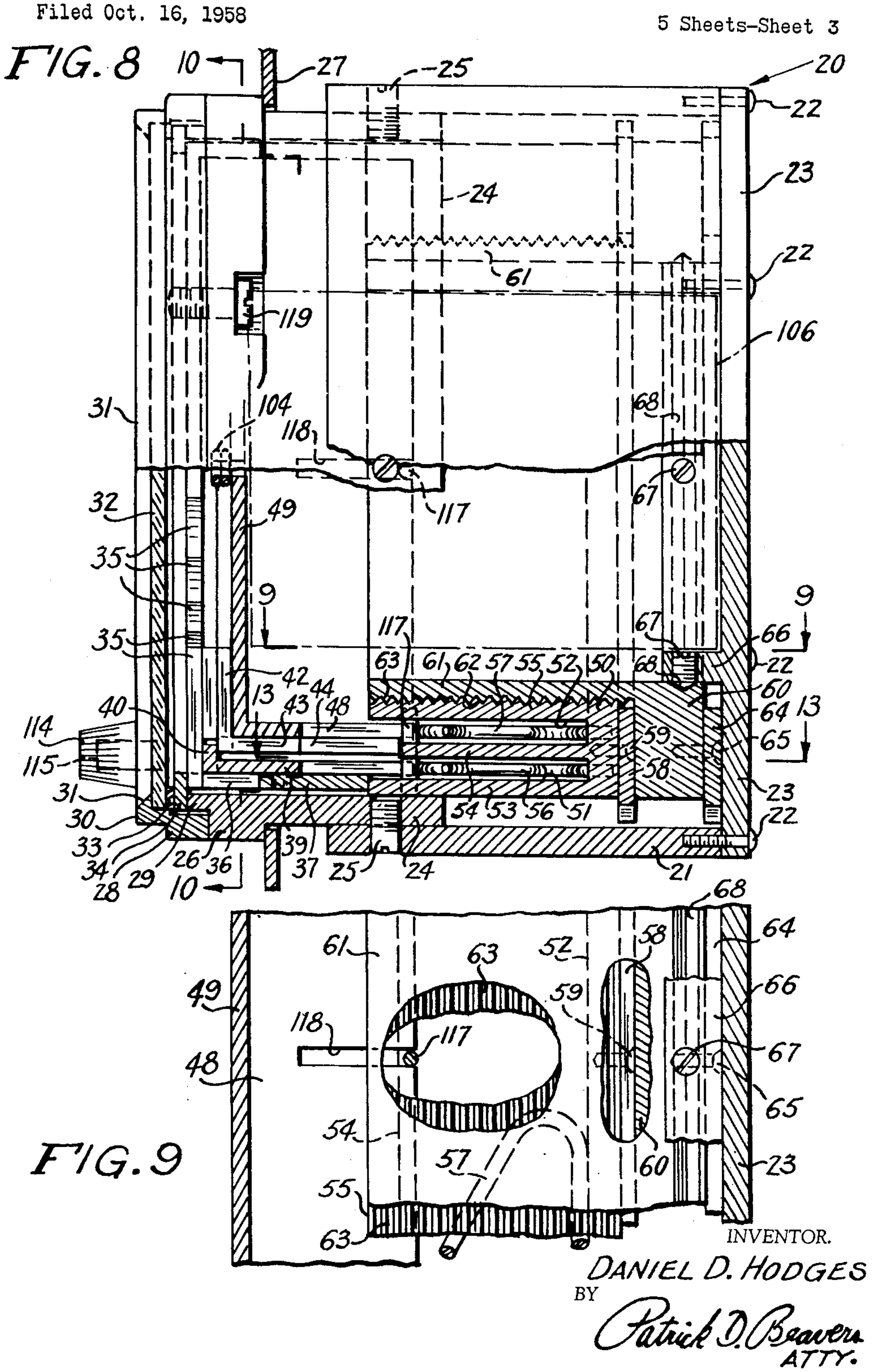
Fig. 8 is a vertical sectional view on the line 8—8 of Fig. 1.
Fig. 9 is a transverse sectional view on the line 9—9 of Fig. 8.

Referring more in detail to the drawings, wherein like parts are designated by like reference numerals, the reference numeral 20 is used to indicate a ground speed computer embodying the invention.

The ground speed computer 20 comprises a main circular housing 21 to which is fastened, by means of fasteners 22, a circular back plate 23, a front housing 24 is telescopically received in the front of the housing 21 and fasteners 25 extend through the housing 21 to engage the housing 24 to retain the housings in fixed relation to each other. The housing 24 has an annular shoulder 26 adjacent the front edge thereof so that when the computer is mounted in an instrument panel 27 the annular shoulder 26 will engage the front face of the panel 27 and the forward edge of the housing 21 will be spaced from the rear face of the panel 27.

A glass retaining ring 28 is telescopically mounted on the forward reduced edge 29 of the housing 24 and the ring 28 is provided with an annular flange 30 having an inturned bevelled rim 31 which engages and retains in position the glass 32. A gasket ring 33 is placed between the glass 32 and a ring or tab stop 34. The tab stop 34 abuts the edge 29 of the housing 24 and thus the glass 32 is firmly retained in position. A first row of a plurality of wedge-shaped tabs 35 are positioned in the housing 24 in engagement with the tab stop 34 and each of the tabs 35 is provided with a rearwardly extending right angularly disposed wedge-shaped flange 36. The tabs 35 are equally spaced, as shown in Fig. 1, and the tabs 35 bear indicia ranging from 0 to 95 and are spaced in numerical value by an interval of 5.

Figure 12:
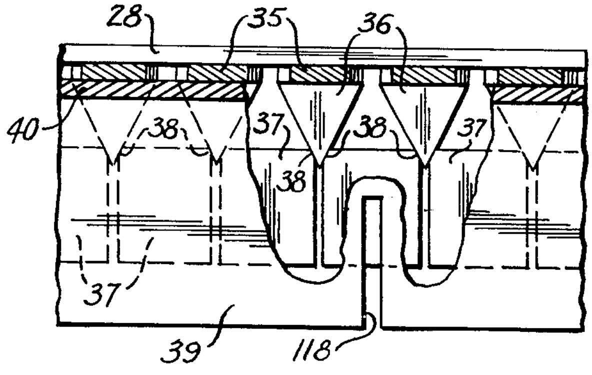
Fig. 12 is a transverse sectional view on the line 12—12 of Fig. 10.

Positioned between each of the flanges 36 of the tabs 35 is a first row of a plurality of spacers 37. The spacers 37 have bevelled corners 38 where the spacers 37 engage the flanges 36, as shown in Fig. 12.

A first stabilizing ring 39 is positioned in contact with the flanges 36 and spacers 37 and the ring 39 is provided at its forward edge with a right angularly disposed inturned flange 40 that engages the rear of the tabs 35. A tab 41 bearing the indicia 0 is secured to the ring 39 by means of a soft rivet passing through the flange 36 into the ring 39.

A second row of a plurality of wedge-shaped tabs 42 are positioned in contact with the flange 40 on the ring 39 and each of the tabs 42 is provided with a rearwardly extending right angularly disposed wedge-shaped flange 43. The tabs 42 are equally spaced as is the first row of tabs 35.

Positioned between each of the flanges 43 of the tabs 42 is a second row of a plurality of spacers 44. The spacers 44 also have bevelled corners where the spacers 44 engage the flanges 43 as previously explained with regard to the flanges 36 and spacers 37.

Figure 14:
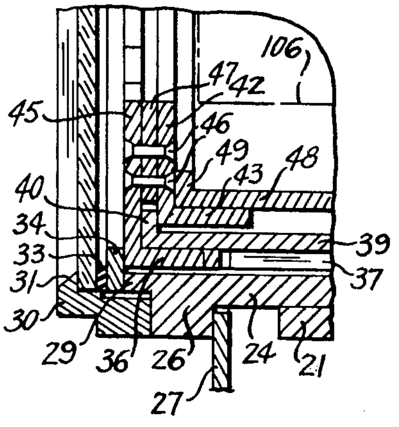
Fig. 14 is a vertical sectional view on the line 14—14 of Fig. 1.
Figure 15:
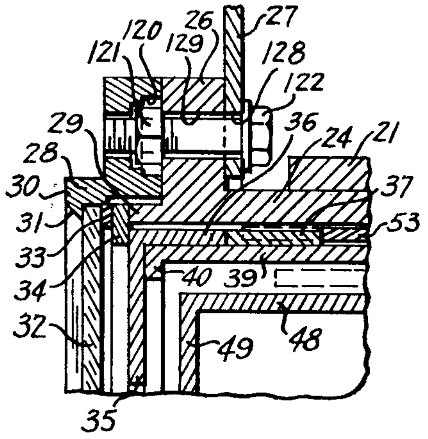
Fig. 15 is a sectional view on the line 15—15 of Fig. 1.

A tab 45, of the first row of tabs 35, bearing the indicia 50 is secured by soft rivets 46 to a tab 42 directly in the rear of the tab 45 and a spacer 47 of the same shape as the tabs 42 and 45 is positioned between the latter tabs and retained in position by the rivets 46, Fig. 14. A second stabilizing ring 48 is positioned in contact with the flanges 43 and the ring 48 is provided at its forward edge with a right angularly disposed inturned flange 49 that engages the rear of the tabs 42 to urge the tabs 42 into engagement with the flange 40 on the ring 39.

A circular spacer housing 50 is positioned in the housing 21 and the housing 50 has a pair of annular open ended slots 51 and 52, respectively, that provided circular flanges 53, 54 and 55, respectively. The flange 53 engages the rear edges of the spacers 37 and the flange 54 engages the rear edges of the spacers 44. A plurality of spring members 56 are positioned in the slot 51 and engage the rear edge of the stabilizing ring 39. A plurality of spring members 57 are positioned in the slot 52 and engage the rear edge of the stabilizing ring 48.

A first spur gear 58 is secured to the rear of the housing 50 by means of soft rivets 59. A spacer housing lifter 60 having an annular flange 61 extending forwardly thereof is positioned in engagement with the spacer housing 50 so that the internal threads 62 on the flange 61 engage the external threads 63 on the flange 55 of the spacer housing 50.

A second spur gear 64 is secured to the rear of the lifter 60 by means of soft rivets 65. An annular circular flange 66 is integral with the inner face of the back plate 23 and set screws 67 engage an anular V-shaped groove 68 in the lifter 60 to permit rotation of the lifter 60, but prevent forward movement thereof.

A curved projection 69 depends outwardly of the edge of the back plate 19 and is provided with an opening 70 to provide a bearing for the rear end of a shaft 71.

The shaft 71 extends longitudinally of the computer 20 through an opening 72 in the shoulder 26 and an opening 73 in the ring 28, and the shaft 71 is journalled at its forward end in bearing washers 74 and 75 that are positioned in openings 76 and 77 that are provided in the ring 28 inwardly of the opening 73. The shaft 71 also extends through a semi-circular recess 78 in the housing 21 that is in alinement with the projection 69.

A pair of U-shaped spring members 80 and 81 are mounted on the outer surface of the projection 69 by a snap clamp 82 and fasteners 83 retain the spring members 80 and 81 on the projection 69.

A small spur gear 86 is mounted on the shaft 71 in contact with the projection 69 and a flat washer 87 is positioned on the shaft 71 within the recess 78 in contact with the gear 86.

A tab spacing gear 88 is slidably mounted on the shaft 71 within the recess 78 and the gear 88 is provided with a socket 89. A pin 90 is positioned in the end of the shaft 71 transversely thereof and the pin 90 is adapted to engage the splines 91 in the forward portion of the gear 88 circumjacent to the shaft 71. A cup-shaped spring housing 92 is mounted on the shaft 71, within the socket 89 in the gear 88, by means of an opening 93 therein and the shaft 71 is provided with a flattened portion 94 that extends from the outer end of the shaft 71 to terminate in the opening 93. A coil spring 95 is mounted in the housing 92 circumjacent to the shaft 71 and the spring 95 at one end engages the housing 92 and at the opposite end engages the bottom of the socket 89. A knob 96 on the outer end of the shaft 71 permits the shaft 71 to be pulled out or pushed in so that a pair of notches 97 and 98, respectively, will selectively engage the spring members 80 and 81.

The rear edge of the housing 24 is provided with a semi-circular recess 99 in which are mounted a pair of spaced pins 100 and 101, respectively, and the pins 100 and 101 are adapted to be engaged by the gear 88 when it is moved forward into the dotted line position shown in Fig. 2.

Figure 10:
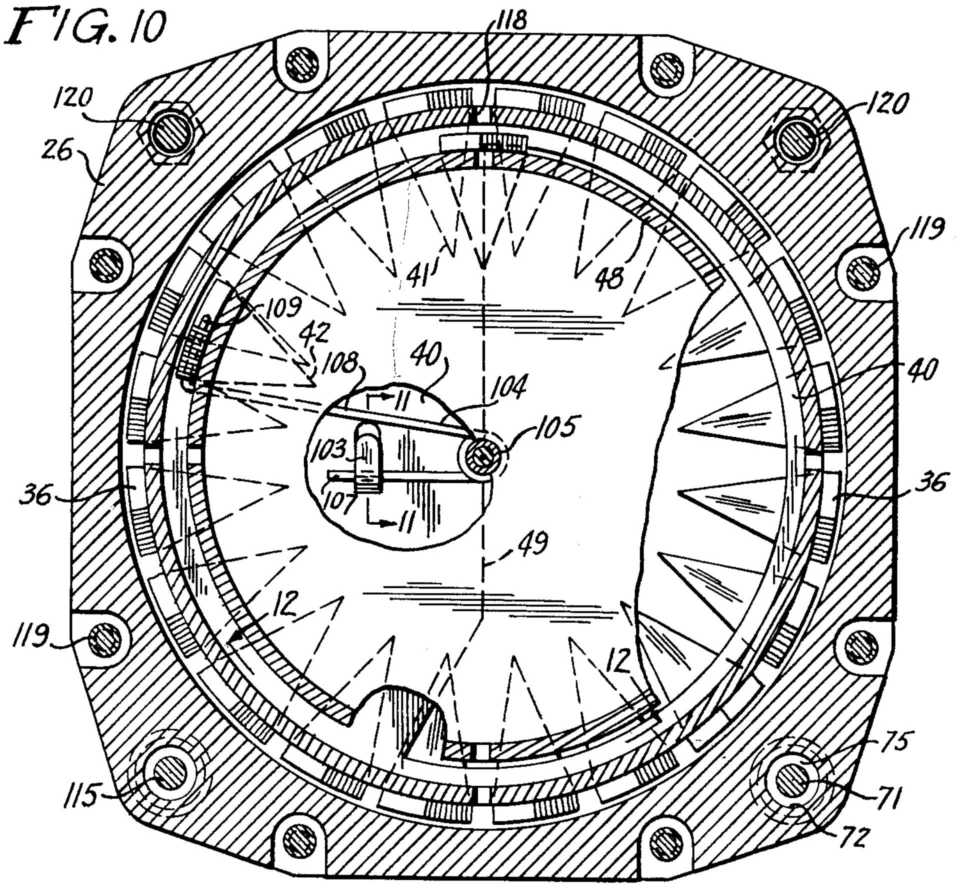
Fig. 10 is a vertical sectional view on the line 10—10 of Fig. 8.
Figure 11:
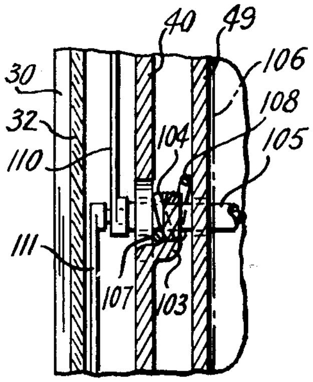
Fig. 11 is a vertical sectional view on the line 11—11 of Fig. 10.
Figure 13:
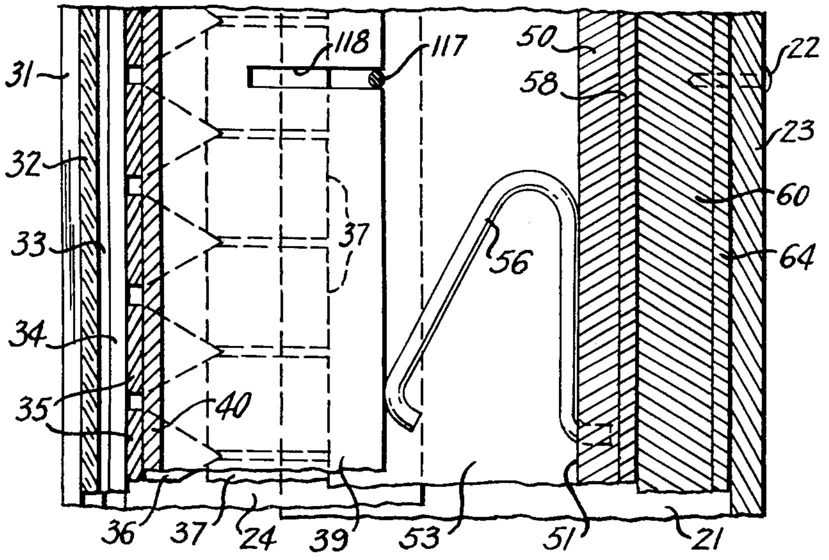
Fig. 13 is a transverse sectional view on the line 13—13 of Fig. 8.

The flange 40 on the ring 39 is provided with a struck out tongue 103 and a U-shaped spring 104 mounted on a shaft 105 of a clock 106 has one leg 107 thereof in engagement with the tongue 103, while the other leg 108 has a right angularly extending portion 109 on the outer end thereof which engages one of the tabs 42, Figs. 10 and 11. The clock 106 is provided with the hour hand 110 and minute hand 111 that cooperate in the conventional manner with the numerals 112 on the clock face 113 that is positioned forwardly of the flange 40. The knob 114, mounted on the shaft 115 that is journalled in a supporting plate 116 connected to the back plate 23, is used to set the clock 106 when found necessary.

Guide pins 117 mounted in the flanges 53, 54 and 55 are adapted to enter the relatively spaced slots 118 in the rings 39 and 48 so that as the housing 50 is rotated to set the tab 41 in line with the minute hand 111, the lifter 60 will rotate with the housing 50, thus, all parts within the housings 21 and 24 will rotate as a unit. Fasteners 119 are used to secure the ring 28 to the housing 24. The ring 28 is provided with hex-shaped recesses 120 at the upper corners thereof so that with a nut 121 positioned therein the computer 20 is secured to the panel 27 when a bolt 122 is extended through an opening 128 in the panel 27 and an opening 129 in the annular shoulder 26. The computer 20 is thus held rigidly on the panel 27 by the bolt and nut assembly 121 and 122.

In the operation of the computer, as the aircraft takes off the pilot sets the tab 41 with the 0 thereon in a position so that the minute hand 111 of the clock 106 points to it, at this point the time of departure is recorded or marked. This is done by turning the knob 96 to the right or left as required. When this action is accomplished the knob 96 is in full "in" position, as shown in Fig. 2, and the gears 88 and 87 are in meshing engagement with each other. Turning of the knob 96 causes rotation of the gears 88 and 87 and subsequent rotation of the complete housing 21 and the complete set of tabs 35. This action is possible because the gears 58 and 64 are attached to housing 50 and housing lifter 60. Thus, the tab 41 with the "0" thereon can be rotated 360 degrees around the face of the clock 106. After the aircraft has reached cruising speed, the pilot selects two bearing points such as land marks or radio stations which appear on the map and he notes the distance in miles separating his selected bearing points, as it appears on the map. When the aircraft is directly over the first bearing point, the pilot again resets the tab 41 with the "0" thereon to point to the minute hand of the clock 106, as set forth above. By checking on the coaction of the minute hand with the tabs 35 he can check the required time that it takes the aircraft to travel from one bearing point to the other. When the aircraft is directly over the second bearing point he then pulls out and turns the knob 96 until the minute hand 111 of the clock 106 coincides with the number on the tabs 35 that indicates the miles between the two bearing points as stated on the map. Thus, the coincidence of the minute hand 111 of the clock 106 with the tab 35 will indicate his speed because as the aircraft moves forward, the minute hand will count the number of miles the aircraft has travelled. Since the face of the clock 106 of the computer 20 is divided by the flange 49, as shown in Fig. 12, and the separated portions of the face are positioned at different levels, the tabs 35 not used to indicate the speed of the aircraft will be hidden behind the uppermost portion, as shown in Fig. 10. Thus, the last visible tab 35 on the face of the clock 106 will indicate the miles per hour the aircraft is travelling.

The computer is designed to make flying easier for the pilot for it is necessary at the present time to compute his ground miles by means of a formula which indicates speed of aircraft, plus tail wind or minus head wind divided by miles travelled. To properly indicate the speed of the aircraft, the computer 20 utilizes the tabs 35 and 42 and the tabs 35 and 42 must be equally spaced around the face of a clock. The spacing between the tabs 35 and 42 may be varied, but at all times the spacing must remain equal. Thus, the tabs 35 and 42 are wedge-shaped so that when the spacers 37 and 44 are forced between the tabs 35 and 42 by movement of the housing 50, the spacing between the tabs 35 and 42 will remain equal at all times.

Movement of the housing 50 is accomplished by turning the knob 96 which will rotate the gear 88. The gear 88 meshing with the gear 58 will cause the housing 50 to travel forwardly by reason of the threads 62 and 63. Thus, when the housing 50 has been moved forwardly as far as it will go, as shown in dotted lines in Fig. 2, the tabs will read 60 miles per hour. This action will tension the spring 104 so that when the housing 50 is moved backward, the spacers 37 and 44 will move rearwardly by reason of the action of the spring 104 and the tabs 35 and 42 will be spaced to indicate 120 miles per hour.

The stabilizing ring 39 is used as a stop for the tabs 42 and the flanges 40 thereon will hide that portion of the tabs 42 not required to indicate land speed. The stabilizing ring 39 holds the tabs 35 against the tab stop 34 and the stabilizing ring 48 holds the tabs 42 against the stabilizing ring 39 and both rings 39 and 48 are urged forwardly by means of spring members 57.

When the knob 96 is pulled outwardly, as shown in dotted lines in Fig. 2, it will move the shaft 71 and the springs 80 and 81 will selectively engage the notches 97 and 98 in the shaft 71 to retain it in the desired position. As the shaft 71 moves forward, the pin 90 is disengaged from the splines 91 and the gear 88 is loose on the shaft 71. As the gear 88 becomes loose on the shaft the spring member 95 pushes against the housing 92 which moves the gear 88 forwardly on the shaft 71 and causes it to engage the pins 100 and 101 and connect it to the housing 24. The gear 58 will then remain stationary. However, the gear 86, by reason of the flattened portion 94 on the shaft 71, will rotate at all times with the shaft 71.

When the knob 96 is now rotated, the gear 86 will rotate the gear 64 and the housing lifter 60 which is attached to the gear 64, thus causing the housing lifter 60 to raise or lower the spacer housing 50 by means of the threads 63 on the flange 55. The spacer housing 50 will move in a straight line by reason of the meshing of the gears 58 and 88, and the spacer housing 50 will move upward and engage the spacers 37 and 44 as previously described. The spacers 37 will be forced between the tabs 35 and the tabs 35 will be spread apart, as shown in Fig. 12. Since the tabs 35 are under the influence of the spring 104 that is attached to the tab 42, as shown in Fig. 10, when the spacer housing 50 moves downward, the spacers 37 will slide down the wedge shaped tabs 35 and allow the space between the tabs 35 to decrease. When the knob 96 is again pushed in the pin 90 will again engage the splines 91 and force the spring member 95 back into the housing 92. The gear 88 will now turn with the shaft 71, thus, the gears 58 and 64 will be simultaneously rotated by the rotation of the gear 88. The stabilizing rings 39 and 48 are rotated as desired when the gear 88 engages the pins 100 and 101.

Thus, when the knob 96 is pushed in, the parts of the computer 20 will move as a unit. This, therefore, is the normal position of the knob because it is the operation of the computer 20 at this time that permits the tab 41 to be alined with the minute hand 111.

The computer 20 indicates the exact time of day the flight started and if the pilot lands his aircraft to refuel, the time is computed and the computer 20 is again reset at 0. This is accomplished by setting the tab 35 indicating the exact miles travelled to point at the minute hand of the clock 106, and by pushing in the knob 96 and rotating the tab 41 having the "0" thereon back to the position it first occupied at the time of departure or take-off, as previously described. The computer 20 must, therefore, be reset every time the aircraft lands. The tabs are marked in intervals of five miles and the tabs may indicate speeds of from 60 to 120 miles per hour. If the aircraft has a greater speed range, the tabs may be marked for 10 mile intervals, thus, the computer can be varied to indicate the speed of any aircraft.

As an example of this operation, if the time of departure from the airfield was 1:55, the pilot would set the tab 41 having the "0" thereon to point to the minute hand of the clock 106 and to point to the 11 on the clock's face. When the pilot has reached his cruising speed and was over his first land mark at exactly 2:00, he would again move the tab 41 having the "0" thereon until it points at the minute hand and the 12 on the clock's face. Now his land marks are exactly 15 miles apart as indicated by his map and he is directly over his second land mark at eaxctly 2:15. He then pulls knob 96 out and spaces his tabs 35 until the tab 35 marked 15, which indicates number of miles between land marks, is pointing at the minute hand of the clock 106 and to the 3 on the clock's face. He now pushes the knob 96 back in and rotates the entire set of tabs 35 back until the tab 41 having the "0" thereon is pointing again at the 11 on the face of the clock 106, which was the time of his departure.

Now the pilot can see by looking at the last tab 35, visible on the clock's face, that he is travelling 60 miles per hour. He can see that if his destination is 90 miles from his departure, as indicated by his map, he will arrive there at 3:25, and after he lands he will reset his computer 20, as previously described.

There has thus been provided a computer that, when properly set, will indicate ground speed and time of departure and arrival and it is believed that the structure and operation of the computer will be apparent to those skilled in the art from the foregoing description.

It is also to be understood that changes in the minor details of construction, arrangement and combination of parts may be resorted to provided they fall within the spirit of the invention and the scope of the appended claims.

Having thus described the invention what is claimed as new and desired to be secured by Letters Patent is:

1. A computer for use with aircraft comprising a main housing, a front housing telescopically mounted in said main housing, a back plate secured to said main housing, a glass retaining ring connected to said front housing, a first row of indicating tabs mounted in said front housing, a first stabilizing ring mounted in said front housing in engagement with said tabs, a second row of tabs mounted in said front housing, a second stabilizing ring mounted in said front housing for engagement with said second row of tabs, a dial having equally spaced graduations on the face thereof mounted in said front housing, a plurality of hands movable at constant but different speeds over the face of said dial in indicating relation to the graduations on the face of said dial, means for moving said rings to move said tabs to cooperate with said hands to indicate the ground speed of the aircraft, and spring members mounted in said front housing for engagement with said stabilizing rings to urge said stabilizing rings into engagement with said tabs.

2. A computer as in claim 1, wherein a spacer housing is mounted in said main housing for engagement with said stabilizing rings and means is provided for moving said spacer housing to move said stabilizing rings.

3. A computer as in claim 2, wherein a gear is connected to said spacer housing and a shaft is journalled in said front housing and said back plate and a gear is mounted on said shaft for engagement with a gear on said spacer housing for the movement of said spacer housing.

4. A computer as in claim 3, wherein a lifter for said spacer housing is mounted in said main housing and coacting threads are provided on said spacer housing and said lifter and a gear is secured to said lifter so that upon rotation of the gear on said shaft said gear will mesh with the gear on said lifter to cause relative movement of said spacer housing in relation to said front housing.

5. A computer for indicating the ground speed of an airplane comprising a main housing, a front housing telescopically mounted in said main housing, a dial having equally spaced graduations on the face thereof mounted in said front housing, a plurality of hands movable at constant but different speeds over the face of said dial in indicating relation to the graduation on the face of said dial, a first circular row of triangular shaped tabs positioned in said front housing in circumjacent relation to said dial, said tabs having indicia thereon that, starting from zero, are spaced by an interval of five, a first circular row of triangularly shaped spacers positioned rearwardly of the circular row of said tabs for coaction with said tabs, a first stabilizing ring positioned rearwardly of said row of spacers and having engagement therewith, a tab bearing the indicia zero thereon secured to said stabilizing ring and positioned for coaction with the first circular row of said tabs, means for moving said spacers to engage said first row of tabs to change the spacing of said tabs and means for rotating said stabilizing ring so that the tab thereon can rotate three hundred and sixty degrees for selective alinement of said last mentioned tab with each tab in said first row of tabs.

6. A computer as in claim 5, wherein a second row of triangular shaped tabs are positioned rearwardly of said first stabilizing ring, said second row of tabs being spaced as is the first row of tabs, a second stabilizing ring positioned rearwardly of said second row of tabs and means on said stabilizing ring for urging the second row of tabs into engagement with said first stabilizing ring for simultaneous movement of both rows of tabs.

7. A computer as in claim 6, wherein a spacer housing is positioned in said front housing for engagement with said row of spacers and means is provided for moving said spacer housing upwardly and downwardly to move said spacers into engagement with said tabs.

8. A computer as in claim 5, wherein a shaft is provided that extends longitudinally of said housings and a tab spacing gear for engagement with said row of tabs is slidably mounted on said shaft.

9. A computer as in claim 8, wherein means is provided for moving said shaft and the tab spacing gear thereon into engagement with said row of tabs for the movement thereof.

References Cited in the file of this patent

UNITED STATES PATENTS

| | | |
|---|---|---|
| 2,289,038 | Putnam | July 7, 1942 |
| 2,334,287 | Reece | Nov. 16, 1943 |